United States Patent Office 3,748,330
Patented July 24, 1973

3,748,330
BENZOXANTHENE AND BENZOTHIOXANTHENE-DICARBOXYLIC ACID TRIAZINYL-IMIDE DYESTUFFS
Otto Fuchs and Helmut Troster, Frankfurt am Main, Germany, assignors to Farbwerke Hoechst Aktiengesellschaft vormals Meister Lucius & Bruning, Frankfurt am Main, Germany
No Drawing. Filed Apr. 13, 1971, Ser. No. 133,755
Claims priority, application Germany, Apr. 14, 1970, P 20 17 763.3
Int. Cl. C07d 55/18, 55/22
U.S. Cl. 260—249.6      7 Claims

ABSTRACT OF THE DISCLOSURE

Benzoxanthene- and benzothioxanthene-dicarboxylic acid imide dyestuffs of the general formula

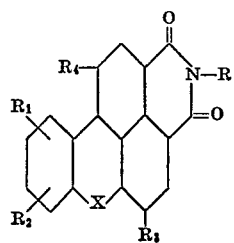

wherein
X is oxygen or sulfur,
R is amino which is substituted by one or two members of the group of alkyl, cyclohexyl, benzyl, acyl, phenyl, β-cyanoethyl, β-hydroxyethyl, sulfamidophenyl, benzoyl, dichlorobenzoyl, sulfamidobenzoyl, carboxamidophenyl, phenylsulfonyl sulfamidodichlorobenzoyl, chlorophenyl, phenoxyacetyl lower alkylsulfamidobenzoyl and benzimidazoyl, or 2,4,6-triaminotriazinyl, 2,4-diamino-6-phenyltriazinyl, 2,4-diamino-6-lower alkyl triazinyl-2,4-diamino-6-hydroxy lower alkyl triazinyl, 2,4-diamino-6-chloro lower alkyl triazinyl, 2,4-diamino-6-phenylamino triazinyl, 2,4-diamino-6-lower alkoxy lower alkoxy triazinyl, 2,4-diamino-6-benzoyl-triazinyl,
$R_1$ and $R_2$ are hydrogen, chlorine, bromine, cyano, lower carbalkoxy, lower alkyl, lower alkoxy and phenyl,
$R_3$ and $R_4$ are hydrogen, lower alkoxy and lower hydroxy alkoxy.

The present invention relates to valuable novel benzoxanthene and benzothioxanthene dicarboxylic acid amide dyestuffs of the general formula

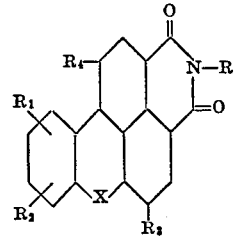

(1)

in which
X represents an oxygen or sulfur atom,
R represents an amino group substituted by an optionally substituted alkyl, cycloalkyl, aralkyl, acyl or aryl group or a heterocyclic radical, or a 1,3,5-triazinyl radical substituted by unsubstituted or substituted amino groups or by alkyl, hydroxy-alkyl, alkoxyalkyl, halogenoalkyl, aralkyl, aryl or heterocyclic groups,
$R_1$ and $R_2$ each represents a hydrogen atom, a halogen atom, especially a chlorine or bromine atom, a cyano group, a carbalkoxy group, for example, a carbomethoxy group, an alkyl, alkoxy or aryl group,
$R_3$ represents a hydrogen atom or an alkoxy group which may be substituted, for example, by a halogen atom, a hydroxy, alkoxy, acyloxy or aryl group, and
$R_4$ represents a hydrogen atom or, being equal to $R_3$, an optionally substituted alkoxy group.

The novel dyestuffs of the above Formula 1 are obtained by condensing benzoxanthene or benzothioxanthene-3,4-dicarboxylic acid anhydrides of the general formula

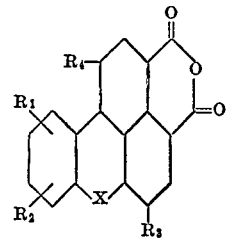

(2)

with a compound of the general formula $$H_2N-R \quad (3)$$

in which Formulae 2 and 3 X, R, $R_1$, $R_2$, $R_3$ and $R_4$ are defined as above, at a temperature within the range of from 100° to 280° C. The dyestuffs, in which R of the General Formula 1 stands for an optionally substituted acylamino group, may also be obtained by reacting benzoxanthene or benzothioxanthene-3,4-dicarboxylic acid hydrazides of the general formula

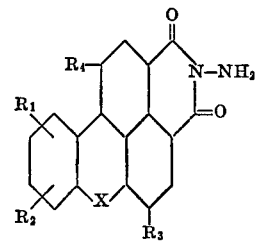

(4)

at a temperature within the range of from about 50° to about 200° C. with carboxylic acid halides or anhydrides of the general formula $$R'COY \quad (5)$$
or
$$(R'CO)_2O \quad (6)$$

or sulfonic acid halides of the general formula $$R'SO_2Y \quad (7)$$

X, $R_1$, $R_2$, $R_3$ and $R_4$ of the cited Formula 4 being as defined above, R' of the cited Formulae 5, 6 and 7 representing an optionally substituted alkyl, cycloalkyl, aralkyl or aryl group and Y of the cited Formulae 5 and 7, representing a halogen atom, for example a chlorine or bromine atom.

In the case where R of the cited Formula 3 stands for a substituted amino group, the benzoxanthene or benzothioxanthene-3,4-dicarboxylic acid anhydrides of the Formula 2 are advantageously heated, optionally under pressure, preferably at 120°–220° C., with at least equimolar, preferably excess, amounts of the corresponding compound of the Formula 3, optionally in an inert solvent and/or diluent, for example water, ethanol, ethyleneglycol monoalkyl ethers or dimethylformamide, furthermore in higher-boiling aromatic hydrocarbons, for example chloro-, dichloro- or trichlorobenzene, α-chloro-naphthalene, or in quinoline or pyridine, for a prolonged period.

Advantageously, acid condensation agents, for example, zinc chloride, zinc acetate or the corresponding cadmium salts, as well as acetic acid, toluene-sulfonic acid, hydrochloric acid, sulfuric acid or phosphoric acid, are added, the condensation agent chosen depends on the solvent or diluent used.

The dyestuffs formed precipitate from the reaction mixture and may be isolated in known manner.

In the case where R of the cited Formula 3 stands for a substituted 1,3,5-triazinyl radical, condensation with the anhydride of Formula 2 is advantageously carried out, preferably at a temperature within the range of from 180° to 240° C., in a high-boiling solvent, such as quinoline or nitrobenzene in the presence of acid condensation agents, for example, zinc chloride, zinc acetate or zinc tosylate or the corresponding cadmium salts.

The dyestuffs isolated in known manner may optionally be freed from unreacted amino triazine or anhydride by treating them with dilute acid or dilute alkaline solution.

Acylation of benzoxanthene or benzothioxanthene-3,4-dicarboxylic acid hydrazides of the Formula 4 may be carried out with equimolar or excess amounts of the acid halides or anhydrides of Formulae 5–7, whereupon mono- or diacyl hydrazides or mixtures thereof are obtained.

The hydrazides (4) are advantageously heated, optionally under pressure, preferably at 70° to 150° C., with the acylation agents of Formulae 5 to 7 optionally in an inert solvent and/or diluent, for example dimethyl-formamide, N-methyl-pyrrolidone, chloro- or dichlorobenzene, pyridine or quinoline.

Suitable hydrazines of Formula 3 for the condensation with benzoxanthene or benzothioxanthene-3,4 - dicarboxylic acid anhydrides are, for example, β-cyano-ethyl hydrazine,
β-hydroxy-ethyl hydrazine,
phenyl hydrazine,
4-chloro-phenyl hydrazine,
2,4-dichloro-phenyl hydrazine,
p-tolyl hydrazine,
3-methoxy-phenyl hydrazine,
4-hydrazino-benzamide,
3- and 4-hydrazinobenzene-sulfonamide,
2-hydrazino-5-sulfonamido-benzimidazole,
2-hydrazino-benzothiazole,
2-hydrazino-pyridine;

furthermore the hydrazides of stearic acid, phenyl-acetic acid,
phenoxy-acetic acid,
benzoic acid,
2,4-dichloro-benzoic acid,
3-sulfonamido-benzoic acid,
2-hydroxy-5-sulfonamido-benzoic acid,
2,4-dichloro-5-sulfonamido-benzoic acid,
3-methylsulfonyl-benzoic acid,
2-hydroxy-4-methyl-benzoic acid, 3-hydroxy-diphenylene-oxide-2-carboxylic acid,
benzene-sulfonic acid,
2,5-dichlorobenzene-sulfonic acid,
p-toluene-sulfonic acid.

Suitable amino triazines are 2,4,6-triamino-1,3,5-triazine (melamine),
2,4-diamino-6-methyl-1,3,5-triazine,
2,4-diamino-6-methylamino-1,3,5-triazine,
2,4-diamino-6-(β-hydroxyethyl)-1,3,5-triazine,
2,4-diamino-(β-ethoxyethyl)-1,3,5-triazine,
2,4-diamino-6-(chloroethyl)-1,3,5-triazine,
2,4-diamino-6-heptyl-1,3,5-triazine,
2,4-diamino-6-phenyl-1,3,5-triazine,
2-amino-4,6-diphenylamino-triazine and
2-amino-4,6-diphenyl triazine.

For the acylation of the hydrazides of Formula 4 there may also be used, in addition to the acid chlorides or acid bromides (Formula 5) or the carboxylic acid anhydrides (Formula 6) already mentioned with the acyl hydrazides, for example, also those of acetic acid or lauric acid, 4-sulfonamido-benzoic acid and the acid chlorides or bromides (Formula 7) of ethane-sulfonic acid, benzene-sulfonic acid, 2,5-dichlorobenzene-sulfonic acid, p-toluene-sulfonic acid, 2-bromobenzene-sulfonic acid, 2,4,5-trimethylbenzene-sulfonic acid and 4-hydroxybenzene-sulfonic acid. The benzoxanthene-3,4-dicarboxylic acid anhydrides or hydrazides of the Formulae 2 or 4 (X=O) used as starting products may be obtained according to the processes described in Italian Pat. No. 863,081, the corresponding benzothioxanthene compounds (X=S) according to German Pat. No. 1,297,259 and British Pat. No. 1,112,726.

The novel compounds according to the invention are valuable, greenish yellow to orange fluorescent dyestuffs which are particularly suitable for the dyeing of condensate resins and synthetic polymers, such as polyvinyl chloride, polystyrene and polymethacrylate.

The most important dyestuffs according to the present invention are those of Formula 1 in which X stands for an oxygen atom. On the materials mentioned above they produce greenish yellow to orange dyeings of intensely blue-green to yellow fluorescence, which are distinguished by a very good fastness to light and some of them, by high reflectance values.

The following examples serve to illustrate the invention:

EXAMPLE 1

31.8 g. of 10-methoxy-benzoxanthene-3,4-dicarboxylic acid anhydride, 24.2 g. of phenyl hydrazine and 5.0 g. of glacial acetic acid were refluxed for 7 hours. The dyestuff of the formula

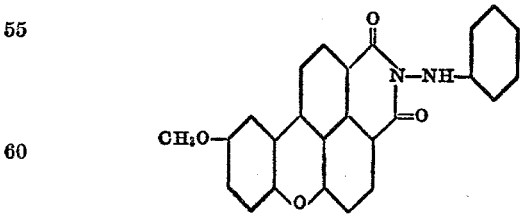

which precipitated in brilliant yellow crystals, was suction-filtered, washed with methanol and dried. It dyes polystyrene and polymethacrylate materials yellow with shades of intense green fluorescence and a good fastness to light. If, instead of phenyl hydrazine, equivalent amounts of 2,4-dichloro-, p-tolyl-, 3-methoxyphenyl hydrazine or 2-hydrazino-pyridine were used, dyestuffs of similar properties were obtained.

EXAMPLE 2

A mixture of 14.4 g. of benzoxanthene-3,4-dicarboxylic acid anhydride, 5.0 of β-cyanoethyl hydrazine and 180 ml. of methyl-glycol were kept boiling for 6 hours. After the reaction had been terminated the reaction mixture was cooled and the yellow dyestuff of the formula

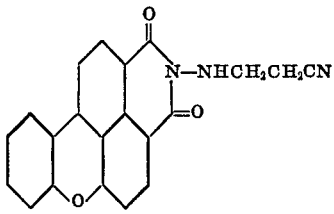

was isolated as indicated in Example 1. The compound produces brilliant greenish-yellow shades having a very good fastness to light on unplasticized polyvinyl chloride.

EXAMPLE 3

16.9 g. of 6-methoxybenzoxanthene-3,4-dicarboxylic acid anhydride were reacted at 135° to 140° C. for 6 hours in the autoclave in 380 ml. of ethanol with 4.5 g. of β-hydroxyethyl hydrazine. The reaction product of the formula

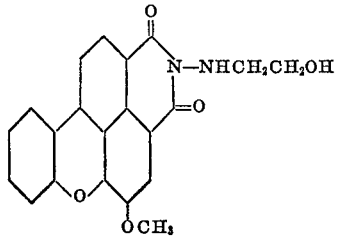

isolated in usual manner dyes polystyrene and polymethacrylate materials with yellow shades of yellow green fluorescence and a good fastness to light.

EXAMPLE 4

A mixture of 15.1 g. of 9-methylbenzoxanthene-3,4-dicarboxylic acid anhydride and 12.8 g. of 3-hydrazinobenzene-sulfonamido hydrochloride was stirred at 190° to 200° C. for 4 hours in 85 g. of quinoline while a slight nitrogen current was passed through. After cooling, the reaction mixture was diluted with 250 ml. of methanol, stirring was continued for several hours, and the precipitated dyestuff of formula

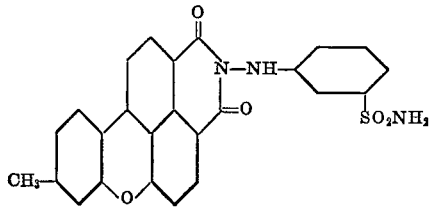

was suction-filtered. It was washed with methanol and then with a large amount of boiling water and dried. This dyestuff can be used for dyeing condensate resins, for example on the basis of melamine formaldehyde, yellow shades of an intense green fluorescence and a good fastness to light, and a very good fastness to bleeding.

EXAMPLE 5

8.4 g. of 9 - chloro-10-methylbenzoxanthene-3,4-dicarboxylic acid anhydride were refluxed for 6 hours with 4.0 g. of benzoic acid hydrazide in 80 g. of o-dichlorobenzene and 8.0 g. of quinoline in the presence of 0.5 g. of zinc chloride. After cooling, the reaction mixture was diluted with 100 g. of ethanol and the dyestuffs of formula

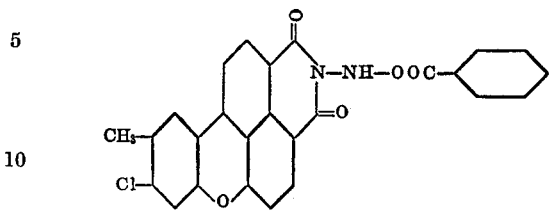

was isolated in known manner. It dyes condensate resins, for example alcohol-modified melamine-formaldehyde resin materials in yellow shades of a green fluoroescence and a good fastness to light.

EXAMPLE 6

36.0 g. of benzoxanthene - 3,4-dicarboxylic acid anhydride, 31.5 g. of 2,4,6-triaminotriazine and 12.5 g. of zinc acetate were introduced into 400 g. of quinoline. Then the mixture was heated at 220 to 235° C., while a slight nitrogen current was passed through, and it was maintained at this temperature for 3 hours. The yellow condensation product was subsequently suction-filtered at room temperature, washed with a small amount of quinoline, then with ethanol and water. The moist filter cake was subsequently treated for 30 minutes each with 300 ml. of boiling 5% hydrochloric acid and then with 300 ml. of boiling 2% potassium carbonate solution and worked up as usual. The dyestuff of formula

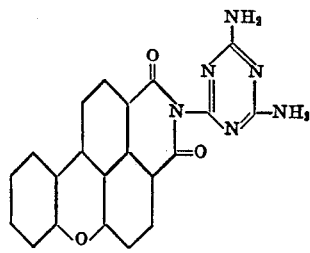

was obtained in the form of a yellow powder. On commercial condensate resins, for example urea-formaldehyde resins this dyestuff produces yellow shades of an intense green fluorescence and a good fastness to bleeding.

EXAMPLE 7

15.9 g. of 9 - methoxybenzoxanthene-3,4-dicarboxylic acid anhydride were kept boiling for 5 hours with 18.7 g. of 2,4-diamino-6-phenyltriazine in 160 g. of nitrobenzene while adding 5.0 g. of zinc acetate. The reaction mixture was diluted with 150 ml. of ethanol after cooling and the dyestuff of formula

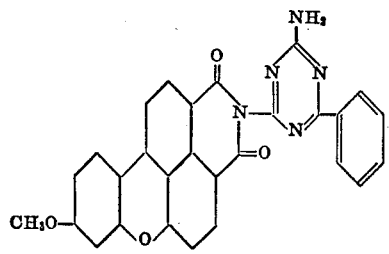

was worked up as described in Example 6.

On condensate resins which are suitable for moulding compositions, for example urea-formaldehyde resins in powder form, shades of a green fluorescence and good fastness properties are obtained.

EXAMPLE 8

5 g. of 9,10-dimethyl-benzothioxanthene-3,4-dicarboxylic acid hydrazide were refluxed for 3 hours in 250 ml. of acetic acid anhydride. The orange-colored diacetyl compound of formula

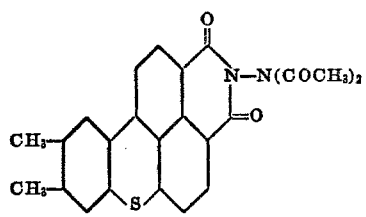

which crystallized while cooling, dyes polymethacrylate materials in golden yellow shades of a green-yellow fluorescence and a very good fastness to light.

EXAMPLE 9

4.3 g. of 2,4-dichlorobenzoic acid chloride were introduced into a suspension of 7.2 g. of 6,10-dimethoxybenzoxanthene - 3,4-dicarboxylic acid hydrazide in 60 g. of quinoline and the mixture was stirred at 180 to 190° C. for 3 hours. The yellow reaction product of formula

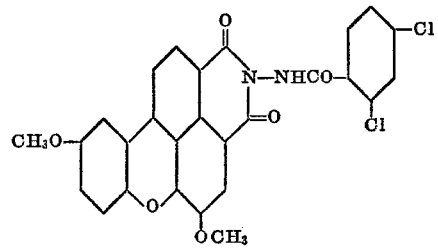

isolated in known manner is very suitable for dyeing polyvinyl chloride brilliant yellow shades.

The following tables shows further fluorescent greenish yellow to orange dyestuffs which are obtained according to the methods described in the above examples.

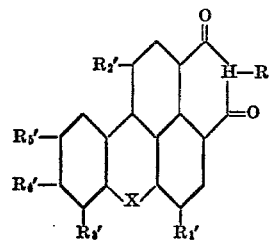

| Example | X | R | $R_1'$ | $R_2'$ | $R_3'$ | $R_4'$ | $R_5'$ | Shade |
|---|---|---|---|---|---|---|---|---|
| 10 | O | NH$_2$–[triazine]–NH | H | H | H | H | OCH$_3$ | Yellow. |
| 11 | O | Same as above | OCH$_3$ | H | H | CH$_3$ | H | Golden yellow. |
| 12 | O | do | H | H | H | CH$_3$ | CH$_3$ | Yellow. |
| 13 | O | NH$_2$–[triazine]–CH$_3$ | H | H | H | H | H | Yellow-green. |
| 14 | O | Same as above | OCH$_3$ | H | H | Br | H | Yellow. |
| 15 | O | NHCH$_2$CH$_2$OH–[triazine]–NH$_2$ | OCH$_3$ | H | H | H | OCH$_3$ | Orange plus yellow. |
| 16 | O | Same as above | OCH$_3$ | OCH$_3$ | H | H | H | Do. |
| 17 | O | NHCH$_2$CH$_2$Cl–[triazine]–NH$_2$ | H | H | H | Cl | H | Yellow plus green. |
| 18 | O | NH$_2$–[triazine]–NH–C$_6$H$_5$ | H | H | CH$_3$ | H | H | Yellow-green. |
| 19 | O | NH$_2$–[triazine]–C$_6$H$_5$ | H | H | CH$_3$ | CH$_3$ | H | Do. |

TABLE—Continued

| Example | X | R | R₁' | R₂' | R₃' | R₄' | R₅' | Shade |
|---|---|---|---|---|---|---|---|---|
| 20 | O | 4-amino-6-(2-ethoxyethoxy)-1,3,5-triazin-2-yl (NH₂, —OC₂H₄OC₂H₅ substituted triazine) | OCH₃ | H | H | Cl | CH₃ | Yellow. |
| 21 | O | 4-amino-6-benzyl-1,3,5-triazin-2-yl (NH₂, —CH₂C₆H₅ substituted triazine) | H | H | Cl | H | H | Yellow-green. |
| 22 | O | 4,6-bis(phenylamino)-1,3,5-triazin-2-yl (NHC₆H₅, —NHC₆H₅ substituted triazine) | H | H | H | H | H | Do. |
| 23 | O | —NHOC—C₆H₄—SO₂NH₂ | H | H | H | H | H | Do. |
| 24 | O | —HN—C₆H₄—CONH₂ | OCH₃ | H | H | CH₃ | H | Yellow. |
| 25 | O | —HN—C₆H₄—SO₂NH₂ | H | H | H | H | OCH₃ | Green-yellow. |
| 26 | O | —NH—(benzimidazolyl-SO₂NH₂) | H | H | H | H | H | Yellow-green. |
| 27 | O | —NHOCCH₂CH₂CH₃ | OCH₃ | OCH₃ | H | H | H | Yellow. |
| 28 | O | —HNOCCH₂—C₆H₅ | H | H | CH₃ | H | H | Yellow-green. |
| 29 | O | —HN—SO₂—C₆H₅ | OCH₃ | H | H | Br | H | Yellow. |
| 30 | O | —HNCO—C₆H₂(SO₂NH₂)(Cl)(Cl) | H | H | H | Br | H | Yellow-green. |
| 31 | O | —HN—C₆H₄—SO₂NH₂ | OCH₂CH₂OH | H | H | Cl | H | Yellow. |
| 32 | S | 4,6-diamino-1,3,5-triazin-2-yl (NH₂, —NH₂ substituted triazine) | H | H | H | H | H | Do. |
| 33 | S | —NH—C₆H₄—SO₂NH₂ | H | H | H | Br | H | Do. |
| 34 | S | —NHOC(CH₂)₁₇CH₃ | H | H | H | CH₃ | CH₃ | Do. |
| 35 | S | —NH—C₆H₄—Cl | OC₂H₅ | OC₂H₅ | H | H | H | Orange. |
| 36 | S | —NHOCCH₂O—C₆H₅ | H | H | H | H | COOCH₃ | Yellow. |
| 37 | S | —HNOC—C₆H₄—SO₂CH₃ | OCH₃ | H | CH₃ | H | H | Orange-yellow. |
| 38 | S | —HN—C₆H₄—SO₂NH₂ | H | H | H | Cl | CH₃ | Yellow. |

We claim:
1. A benzoxanthene- or benzothioxanthene-dicarboxylic acid triazinyl-imide dyestuff of the formula

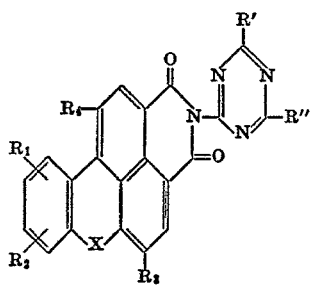

wherein X is O or S, $R_1$ and $R_2$ each is hydrogen, chlorine, bromine, cyano, lower alkyl, lower alkoxy, lower carbalkoxy or phenyl, $R_3$ and $R_4$ each is hydrogen, lower alkoxy or hydroxy lower alkoxy, R' is alkyl of 1 to about 7 carbon atoms, hydroxy lower alkyl, chloro lower alkyl, lower alkoxy lower alkyl, lower alkoxy lower alkoxy, phenyl lower alkyl, phenyl, amino, lower alkyl amino, hydroxy lower alkyl amino, chloro lower alkyl amino or phenyl amino, and R" is amino, phenyl or phenylamino.

2. A dyestuff according to claim 1 wherein X is O.
3. A dyestuff according to claim 1 wherein X is S.
4. A dyestuff according to claim 1 wherein X is O, $R_1$ is hydrogen, methyl, methoxy, chlorine or bromine, $R_2$ is hydrogen or methyl, $R_3$ is hydrogen or methoxy, and $R_4$ is hydrogen or methoxy.
5. A dyestuff according to claim 1 wherein X is O and R" is amino.
6. A dyestuff according to claim 1 wherein X is O, $R_1$, $R_2$, $R_3$ and $R_4$ each is hydrogen, and R' and R" each is amino.
7. A dyestuff according to claim 1 wherein X is O, $R_1$ is methoxy, $R_2$, $R_3$ and $R_4$ each is hydrogen, R' is phenyl and R" is amino.

References Cited
UNITED STATES PATENTS
3,357,985  12/1967  Fuchs et al. _____ 260—249.6 X
3,546,222  12/1970  Irving et al. _____ 260—249.6

JOHN M. FORD, Primary Examiner

U.S. Cl. X.R.
260—249.5, 249.9, 249.8, 281; 8—162